United States Patent Office 2,766,258
Patented Oct. 9, 1956

2,766,258
PROCESS FOR ISOLATION OF ALKYLENE CARBONATES

John David Malkemus, Austin, Tex., assignor to Jefferson Chemical Company, Inc., New York, N. Y., a corporation of Delaware No Drawing. Application May 15, 1952,
Serial No. 288,053

14 Claims. (Cl. 260—340.2)

This invention relates to the isolation of alkylene carbonates from mixtures thereof with water soluble salts and by-products, such as glycols and polyglycols, which are usually produced when a vicinal alkylene chlorohydrin is reacted with an alkali metal carbonate, bicarbonate, or sesquicarbonate, or when an alkylene oxide is reacted with carbon dioxide in the presence of a catalyst. More particularly this invention relates to the recovery of ethylene carbonate from the reaction mixture resulting from the reaction of ethylene chlorohydrin with an alkali metal carbonate, bicarbonate or sesquicarbonate.

It has been proposed to treat the heterogeneous reaction mixture containing ethylene carbonate, sodium chloride, water, unreacted ethylene chlorohydrin and by-products, chiefly glycols, by heating under vacuum to remove water and unreacted chlorohydrin and thereafter to separate the ethylene carbonate from the salt by filtration. This recovery procedure has a number of disadvantages among which may be mentioned (1) the separation of the ethylene carbonate by filtration from the salt cake entails large losses of the ethylene carbonate and (2) the recovered ethylene carbonate is contaiminated with by-product glycols which cannot be separated readily from the ester by conventional means of effecting purification of the ester such, for example, as distillation or fractional crystallization techniques.

It is an object of this invention to provide a process for isolating an alkylene carbonate from a mixture containing the same along with water soluble salts and other by-products, such as glycols and polyglycols, which process is relatively simple to carry out, results in high recoveries of the alkylene carbonate and in the recovery of the ester in a relatively pure form substantially uncontaminated with by-product glycols.

Other objects and advantages of this invention will be apparent from the following detailed description thereof.

In accordance with this invention the alkylene carbonate-containing mixture is extracted with a chlorinated or brominated hydrocarbon containing 1 or 2 carbon atoms or ethers containing 3 or 4 carbon atoms and having a boiling point below about 200° C. at a pressure of 760 mm. of mercury. Examples of such halogenated hydrocarbons are ethylene dichloride, methylene dichloride, chloroform, 1,1,2-trichloroethane, corresponding bromo compounds and 1,1,2,2-tetrachloroethane. Examples of such ethers are monochlorodiethyl ether, methylchloroethyl ether, the corresponding bromo ethers and $\beta,\beta'$-dichlorodiethyl ether. The resulting alkylene carbonate solution is separated from the salt and water and the ester solution then treated to separate the ester from the solvent. The extraction may be carried out at any temperature below the boiling point of the mixture under the pressure conditions at which the extraction is effected. Desirably, it is conducted under atmospheric temperature and pressure conditions.

The above identified chlorinated or brominated hydrocarbons and ethers, it has been found, selectively dissolve the alkylene carbonate and the resultant solution forms a separate layer from that containing the salt and water. Furthermore, these solvents are chemically inert to the alkylene carbonate, i. e., do not react therewith and can be readily separated from the ester by distillation. They distill off at a temperature substantially below the boiling point of the ester and, hence, can be separated from the ester by distillation without subjecting the ester to such temperatures as would result in excessive thermal decomposition with consequent loss of product. Of the above named solvents ethylene dichloride is preferred.

While the process may be carried out by adding the solvent directly to the slurry containing the ester and precipitated salt, e. g., sodium chloride, in the solid phase followed by filtration to effect separation of the solid phase which desirably is washed with solvent to remove adherent ester, it is preferred to add to the reaction mixture containing sodium chloride in the solid phase, sufficient water to dissolve the salt. The resultant liquid mixture is then extracted with the solvent, either batchwise or continuously and the solvent extract separated from the aqueous salt solution. This separation takes place readily, for example, by stratification into two layers, one of which—the non-aqueous layer—contains the ester solution in the solvent, and the other—the aqueous layer —contains the salt solution and most, if not all, of the by-products, followed by the separation of these two layers, for example, by decantation. The solvent is thereafter removed from the ester solution by distillation to drive off the solvent leaving the ester as a solid residue.

In addition, it has been found that the solvents above not only serve to isolate and separate the ester from the crude mixture but also result in a purification of the ester. This is probably attributable to the fact that the by-product glycols are more soluble in the aqueous salt solution than in the solvent and dissolve substantially completely in the aqueous salt solution which is separated from the solvent solution of ester.

Reaction mixtures containing an alkylene carbonate which may be treated in accordance with this invention, are produced by reacting vicinal alkylene chlorohydrins with alkali metal carbonates, bicarbonates or sesquicarbonates or by reacting an alkylene oxide with carbon dioxide in the presence of a hydroxide, carbonate or bicarbonate of a quaternary ammonium base as catalyst and after completion of the reaction neutralizing the catalyst with hydrochloric acid. Thus, for example, ethylene chlorohydrin may be reacted with an alkali metal carbonate, bicarbonate or sesquicarbonate. The resultant reaction mixture usually is a heterogeneous mixture consisting of a solid phase, chiefly alkali metal chloride, and one or more liquid layers containing the desired alkylene carbonate, unreacted chlorohydrin, water and by-products, chiefly glycols and polyglycols. As the alkali metal carbonate, bicarbonate or sesquicarbonate, sodium, potassium or lithium salts may be used. The sodium salts are preferred because they are less costly.

In my copending application Serial No. 276,689, now abandoned, filed March 14, 1952, there is disclosed and claimed a process of making alkylene carbonates by reacting a vicinal alkalene chlorohydrin with an alkali metal carbonate, bicarbonate or sesquicarbonate under a superatmospheric pressure of carbon dioxide. This reaction may be employed, for example, to produce ethylene carbonate, 1,2-propylene carbonate, 1,2-butylene carnate, 2,3-butylene carbonate, and vinyl ethylene carbonate by reacting the corresponding vicinal chlorohydrin with an alkali metal carbonate, bicarbonate, or sesquicarbonate. The desired ester product may be isolated from the resultant reaction mixture by the process of this invention.

The catalytic reaction noted above is the subject of copending patent application Serial No. 280,853, filed April 5, 1952. As disclosed in this application, preferred catalysts are the quaternary ammonium compounds having the following structural formula:

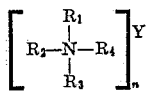

in which $R_1$, $R_2$, $R_3$, and $R_4$ are the same or different, are alkyl, aralkyl, alkenyl (a monovalent radical containing a double bond including, for example, allyl and vinyl) or aminoalkyl groups containing from 1 to 20 carbon atoms, the sum of the carbon atoms $R_1$, $R_2$, $R_3$, and $R_4$ is not less than 4 and not more than 40, Y is a hydroxide, carbonate or bicarbonate radical and the value of $n$ is equal to the valence of Y, and quaternary ammonium compounds having the following structural formula:

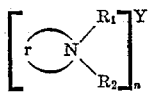

in which $R_1$, $R_2$ $n$ and Y have the meaning noted above and $r$ is a divalent radical as follows:

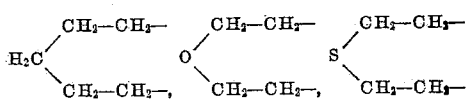

or

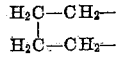

Examples of such quaternary ammonium compounds are trimethyl benzyl ammonium hydroxide, tetraethyl ammonium hydroxide, trimethyl cetyl ammonium hydroxide, trimethyl butyl ammonium hydroxide, tetrabutyl ammonium hydroxide, diethyl diamyl ammonium hydroxide, other tetraalkyl ammonium hydroxides in which the alkyl groups are the same or different and each alkyl group contains from 1 to 20 carbon atoms, the corresponding carbonates and bicarbonates, of the above enumerated compounds, methyl ethyl piperidinium hydroxide, ethyl butyl pyrrolidinium hydroxide, methyl decyl piperidinium hydroxide, 4,4-benzyl methyl morpholinium hydroxide, 4,4-diallyl morpholinium hydroxide, 4,4-methyl hexyl morpholinium hydroxide, 4,4-ethyl butyl morpholinium hydroxide, 4,4-diethyl thiomorpholinium hydroxide, other dialkyl piperidinium, pyrrolidinium, morpholinium, and thiomorpholinium hydroxides, in which the alkyl groups are the same or different and contain from 1 to 20 carbon atoms, the corresponding carbonates and bicarbonates of such piperidinium, pyrrolidinium, morpholinium and thiomorpholinium compounds, N,N,N,N',N'-hexamethylethylene-bis-ammonium hydroxide, carbonate and bicarbonate and ion exchange resins containing quaternary ammonium groups, such as the resins Amberlite IRA–400 and Amberlite IRA–410 manufactured by Rohm & Haas, and Dowex-1 and Dowex-2 manufactured by the Dow Chemical Company. These resins contain quaternary ammonium chloride polymers. In the use of the resins as catalyst, the chloride ion is replaced by the bicarbonate ion by treatment of the resins with sodium bicarbonate solution.

The catalytic reaction is carried out at a temperature of from 100° to about 225° C., preferably from 175° to 215° C., and under a pressure of from 300 to 5000 pounds per square inch gauge, preferably 1000 to 2500 pounds per square inch gauge.

The alkylene oxides which may be employed in the reaction are those of the oxirane system. Preferably the alkylene oxides employed have a structural formula:

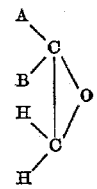

in which A or B may be hydrogen, phenyl, alkyl, or alkenyl, which alkyl or alkenyl group contains from 1 to 20, preferably 1 to 5, carbon atoms.

Alkylene carbonates are useful as solvents and as chemical intermediates. They dissolve many resins and polymeric materials, for example, polyamides and acrylic polymers. They are useful in chemical synthesis for substituting a beta-hydroxy alkyl group in place of the active hydrogen atom of amines, alcohols, mercaptans, phenols, thiophenols, and carboxylic acids. They react with ammonia and also with many amines to form hydroxyalkyl carbamates. Alkylene carbonates of present commercial interest are those containing from 2 to 10 carbon atoms; of these the most important at the present time is ethylene carbonate.

The following examples illustrate the invention but are not to be regarded as limiting it in any way.

*Example I*

443 grams (5.5 mols) of ethylene chlorohydrin, 420 grams (5 mols) of sodium bicarbonate and 600 grams of water are placed in a reactor and 27 grams of carbon dioxide gas introduced so that the pressure is about 200 pounds per square inch gauge. The sealed reactor is then heated to 80° C. for 2½ hours while agitating the reaction mixture. At the conclusion of the reaction the reaction mixture is cooled and the pressure reduced to atmospheric. Hydrochloric acid is then added to neutralize any unreacted sodium bicarbonate. 16 ml. of 6 N. hydrochloric acid is added for this purpose.

200 ml. of water is added to dissolve the salt and the resulting mixture extracted with 5 portions each containing 312 grams of ethylene dichloride. The weight of the first extract is 594 grams which corresponds to a 282 gram increase in weight mainly due to ethylene carbonate dissolved by the solvent. The weight increases of the second, third, fourth, and fifth extracts are respectively 71 grams, 28 grams, 15 grams, and 12 grams. The extracts are combined and the solvent removed by distillation under pressure of about 165 mm. mercury. The liquid which remains is colorless, has a freezing point of 35.7° C. and weighs 374 grams. This product is 99.1% by weight of pure ethylene carbonate; the yield is thus about 84% on the basis of sodium bicarbonate taken.

*Example II*

520 grams of propylene chlorohydrin, 540 grams of water, and 420 grams of sodium bicarbonate are placed in a stainless steel reactor. Carbon dioxide gas is introduced until the pressure is 500 pounds per square inch gauge, and this pressure is maintained while the reaction mixture is heated with stirring at 80° C. The reactor is cooled to room temperature and emptied. The aqueous reaction mixture is extracted three times with ethylene dichloride, using first 600 cc. and then two 300 cc. portions. Evaporation of the solvent under reduced pressure leaves a residue of 410 grams of propylene carbonate. This amounts to a yield of 80% based on the sodium bicarbonate charged into the reactor.

*Example III*

Into a steel autoclave is introduced 400 grams of ethylene oxide and 5 grams of trimethylbenzyl ammonium bicarbonate. Carbon dioxide gas is introduced until the pressure in the autoclave is about 1000 pounds per square inch gauge. The autoclave is then heated for 2 hours at 160°–180° C. while the pressure is kept at at least 1000 pounds per square inch gauge by the addition of more carbon dioxide as it is required. The crude product, which weighs 750 grams, is dissolved in 2 liters of ethylene dichloride and is washed with water containing a trace of hydrochloric acid to remove the catalyst. The solvent is removed by distillation, finally under reduced pressure, and 730 grams of ethylene carbonate melting at 35.5° C. is left as residue.

The reaction mixture may be treated with the hydrochloric acid before extraction with the ethylene dichloride. Any of the quaternary ammonium bases mentioned above, including polymers thereof, may be substituted for the trimethylbenzyl ammonium bicarbonate.

*Example IV*

886 grams of ethylene chlorohydrin, 840 grams of sodium bicarbonate, and 1275 grams of water are placed in an autoclave and pressured with carbon dioxide to a pressure of 500 pounds per square inch gauge. The mixture is heated to 80° C. with stirring, and after 2½ hours is cooled and emptied out of the autoclave, which is then washed out with 334 grams of water; the washings are added to the crude reaction mixture. The resulting solution is extracted three times with methylene dichloride, using first 1700 grams, then 1000 grams, and finally 900 grams. Evaporation of solvent from the combined extracts (removing the last traces under reduced pressure) leaves a residue of 758 grams of colorless ethylene carbonate melting at 35.7° C. and assaying 99.1% ethylene carbonate. The yield of pure ethylene carbonate is thus about 85.3% on the basis of the sodium bicarbonate charged into the autoclave.

*Example V*

354 grams of ethylene chlorohydrin, 336 grams of sodium bicarbonate, and 510 grams of water are charged into an autoclave which is then pressured with carbon dioxide to a pressure of 500 pounds per square inch gauge. The mixture is heated to 85° C. with stirring, and after 2½ hours is cooled and emptied out of the autoclave. The reaction vessel is washed out with 135 grams of water, the washings being added to the product mixture. The resulting solution is then extracted three times with chloroform, using first 750 grams, then 450 grams, and finally 400 grams. By removing the solvent from the combined extracts by vacuum-evaporation there is obtained an ethylene carbonate product melting at 35.7° C. and of 99.1% purity in a yield of 82% on the basis of sodium bicarbonate charged into the autoclave.

The substitution of the other solvents hereinabove named including 1,1,2,2-tetrachloroethane, β,β'-dichlorodiethyl ether, monochlorodiethyl ether, methylchloroethyl ether, ethylene dibromide, methylene dibromide, bromoform, monobromodiethyl ether, or methylbromodiethyl ether for the solvents in the above examples gives similar results.

It is to be understood that this invention is not restricted to the present disclosure otherwise than as defined by the appended claims.

What is claimed is:

1. A process for isolating an alkylene carbonate from a mixture thereof with water soluble salts and glycols which comprises extracting the alkylene carbonate with a solvent having a boiling point below about 200° C. at a pressure of 760 mm. of mercury from the group consisting of chlorinated hydrocarbons containing from 1 to 2 carbon atoms, brominated hydrocarbons containing from 1 to 2 carbon atoms, chlorinated ethers containing 3 to 4 carbon atoms and brominated ethers containing 3 to 4 carbon atoms, and thereafter distilling the extract to drive off the solvent leaving the alkylene carbonate as residue.

2. A process for isolating an alkylene carbonate from a mixture thereof with water soluble salts and glycols which comprises removing the alkylene carbonate from said mixture by extracting it with a solvent having a boiling point below about 200° C. at a pressure of 760 mm. of mercury from the group consisting of chlorinated hydrocarbons containing from 1 to 2 carbon atoms, brominated hydrocarbons containing from 1 to 2 carbon atoms, chlorinated ethers containing 3 to 4 carbon atoms and brominated ethers containing 3 to 4 carbon atoms, and thereafter separating the alkylene carbonate from the resulting solution.

3. A process for isolating an alkylene carbonate from a reaction mixture containing alkylene carbonate, unreacted chlorohydrin, sodium chloride in the solid phase, water and alkylene glycols which comprises adding water in amount sufficient to dissolve the sodium chloride, mixing the resultant solution with a solvent having a boiling point below about 200° C. at a pressure of 760 mm. of mercury from the group consisting of chlorinated hydrocarbons containing from 1 to 2 carbon atoms, brominated hydrocarbons containing from 1 to 2 carbon atoms, chlorinated ethers containing 3 to 4 carbon atoms and brominated ethers containing 3 to 4 carbon atoms to form a solution of the alkylene carbonate in said solvent, separating said solution of alkylene carbonate in said solvent from the salt solution and distilling the solution of alkylene carbonate to drive off the solvent leaving the alkylene carbonate as a residue.

4. A process for isolating ethylene carbonate from a mixture thereof with water soluble salts and glycols which comprises extracting the ethylene carbonate with a solvent having a boiling point below about 200° C. at a pressure of 760 mm. of mercury from the group consisting of chlorinated hydrocarbons containing from 1 to 2 carbon atoms, brominated hydrocarbons containing from 1 to 2 carbon atoms, chlorinated ethers containing 3 to 4 carbon atoms and brominated ethers containing 3 to 4 carbon atoms, and thereafter distilling the extract to drive off the solvent leaving the ethylene carbonate as residue.

5. A process for isolating ethylene carbonate from a reaction mixture containing ethylene carbonate, unreacted chlorohydrin, sodium chloride in the solid phase, water and ethylene glycol which comprises adding water in amount sufficient to dissolve the sodium chloride, mixing the resultant solution with ethylene dichloride to form a solution of the ethylene carbonate in ethylene dichloride, separating said ethylene dichloride solution of ethylene carbonate from the sodium chloride solution and distilling the ethylene dichloride solution of ethylene carbonate to drive off the ethylene dichloride leaving the ethylene carbonate as a residue.

6. A process for isolating alkylene carbonates from a reaction mixture produced by reacting an alkylene oxide of the oxirane system with carbon dioxide in the presence of a catalyst from the group consisting of the hydroxides, carbonates and bicarbonates of quaternary ammonium bases which comprises neutralizing the catalyst with hydrochloric acid, extracting the resulting reaction mixture with a solvent having a boiling point below about 200° C. at a pressure of 760 mm. of mercury from the group consisting of chlorinated hydrocarbons containing from 1 to 2 carbon atoms, brominated hydrocarbons containing from 1 to 2 carbon atoms, chlorinated ethers containing 3 to 4 carbon atoms and brominated ethers containing 3 to 4 carbon atoms, and thereafter distilling the extract to drive off the solvent leaving the alkylene carbonate as residue.

7. A process according to claim 4 in which the solvent is methylene dichloride.

8. A process according to claim 4 in which the solvent is chloroform.

9. A process according to claim 4 in which the solvent is ethylene dichloride.

10. A process according to claim 1 in which the solvent is 1,1,2-trichloroethane.

11. A process according to claim 1 in which the solvent is β,β'-dichlorodiethylether.

12. A process according to claim 1 in which the solvent is methylene dichloride.

13. A process according to claim 1 in which the solvent is chloroform.

14. A process according to claim 1 in which the solvent is ethylene dichloride.

References Cited in the file of this patent

UNITED STATES PATENTS

| | | |
|---|---|---|
| 1,907,891 | Steimmig et al. | May 9, 1933 |

FOREIGN PATENTS

| | | |
|---|---|---|
| 448,708 | Great Britain | June 12, 1936 |
| 740,366 | Germany | Oct. 19, 1943 |

OTHER REFERENCES

Beilstein, vol. XIX, page 100.